UNITED STATES PATENT OFFICE.

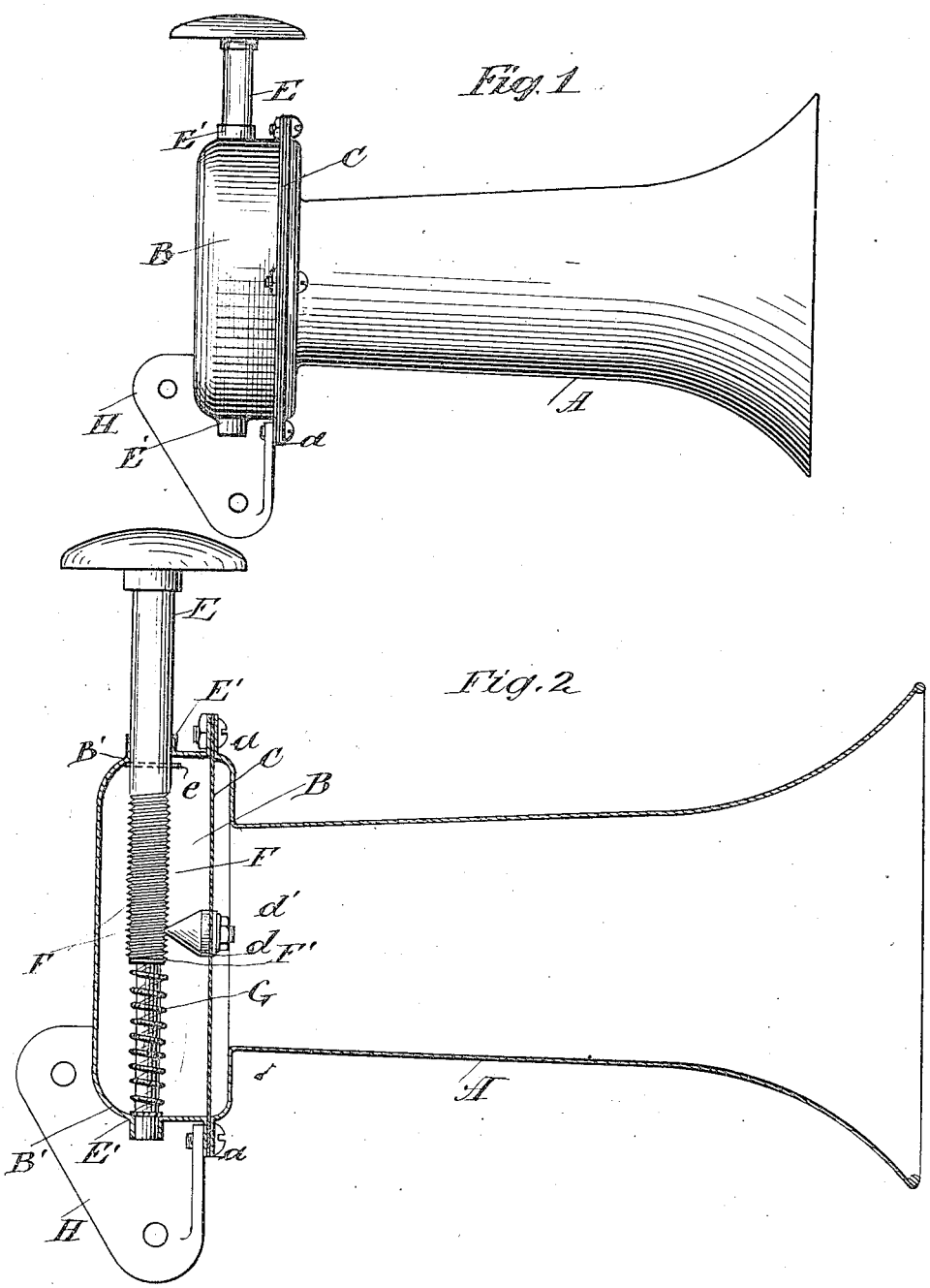

FREDELLIA H. MOYER, OF EUCLID HEIGHTS VILLAGE, OHIO.

MECHANICAL HORN.

1,204,304. Specification of Letters Patent. Patented Nov. 7, 1916.

Application filed February 5, 1915. Serial No. 6,231.

*To all whom it may concern:*

Be it known that I, FREDELLIA H. MOYER, a citizen of the United States, and resident of Euclid Heights village, in the county of Cuyahoga and State of Ohio, have invented certain new and useful Improvements in Mechanical Horns, of which I hereby declare the following to be a full, clear, and exact description, such as will enable others skilled in the art to which it appertains to make and use the same.

The objects of the invention are to provide improved mechanism for operating a mechanical horn or hand operated phone for automobiles, which is of simple and efficient construction and provides a practical instrument for daily use, which is independent of the operation of a battery and electric circuit and is always ready for use.

The device can readily be attached to any convenient point of support such as the door or post of the steering wheel. The device is also constructed and arranged to provide a substantially continuous sound when operated, so as to compel attention as the machine passes along the road.

Other features comprise mechanism which can be quickly and cheaply assembled, and which supply a demand for a horn which is durable and cannot easily be put out of operative condition.

The operating mechanism comprises the depressible stem having a rack or threads cut therein, which are engaged by an anvil or projecting point upon the center of a vibratable diaphragm secured within the horn, and a return spring for the depressible stem possessed of sufficient power to return the stem to its original position when it is released, and thus operate the diaphragm on the return stroke of the stem as well as upon the downward stroke.

The invention further comprises the combination and arrangement of parts and construction of details hereinafter described, shown in the accompanying drawings and specifically pointed out in the claims.

In the accompanying drawings Figure 1 is an exterior view of the device; Fig. 2 is a longitudinal central section thereof.

In these views A is the trumpet of the device, B a chamber communicating with the same in the rear thereof; C is the diaphragm secured between the walls of the chamber and horn at the annular inner edge $a$ thereof, which is preferably expanded for this purpose.

D is the anvil comprising a preferably hardened steel point secured to the center of the diaphragm by means of the washer $d$ and nut $d'$.

E is a stem which moves freely in bearings E', E' in the wall B' of the chamber. The stem is provided with a head which can be struck by the hand.

At F, F, the stem is provided with teeth or spiral threads having preferably sharp edges which are engaged by the point of the anvil as the stem is depressed, thus giving the diaphragm a rapid vibration and producing a distinct loud tone. A spring G preferably encircles the lower part of the stem and engages the lower wall of the chamber and a shoulder F' upon the stem. This spring is powerful enough to vibrate the diaphragm upon the return stroke of the stem. Without the use of the spring the horn can be manually sounded by moving the rod in both directions. The horn is thus operated upon both the downward and return strokes of the stem, making its action substantially continuous, while in operation. A bracket H or other attaching means is made a portion of the chamber so that the device may be secured within reach of the driver. This form of construction also permits the stem to be made of cylindrical material and threaded like a screw, and the chamber B forms a shallow sounding box for the horn, thus making the construction simple and the parts easily assembled and durable in use.

Having described the invention what I claim as new and desire to secure by Letters Patent is:

1. In combination, in a mechanical horn, a trumpet having a flanged base, a resonant sound chamber having a front opening to the walls of which said trumpet base is secured, a diaphragm separating said chamber and trumpet, an anvil centrally attached to said diaphragm and having a central point, and a movable stem reciprocable and rotatable in said chamber, said stem having a continuous screw thread upon its periphery in constant engagement with said central point on said anvil.

2. In a device of the character described, a horn, a chamber secured to one end of the horn, a diaphragm located between the chamber and the horn, a detent carried by and projecting through the diaphragm, a manually operable rod circular in cross-section formed with a screw-thread adapted to impinge upon the detent, whereby the diaphragm may be vibrated, a spring to return the rod to its initial position following the manual operation, and means for limiting the return movement of the rod.

In testimony whereof, I hereunto set my hand this 2nd day of Feby., 1915.

FREDELLIA H. MOYER.

In presence of—
 WM. J. KLOTZBACH,
 WM. M. MONROE.

Copies of this patent may be obtained for five cents each, by addressing the "Commissioner of Patents, Washington, D. C."